(12) United States Patent
Dickson

(10) Patent No.: US 6,750,995 B2
(45) Date of Patent: Jun. 15, 2004

(54) ENHANCED VOLUME PHASE GRATING WITH HIGH DISPERSION, HIGH DIFFRACTION EFFICIENCY AND LOW POLARIZATION SENSITIVITY

(76) Inventor: LeRoy David Dickson, P.O. Box 461177, Leeds, UT (US) 84746-1177

( * ) Notice: Subject to any disclaimer, the term of this patent is extended or adjusted under 35 U.S.C. 154(b) by 0 days.

(21) Appl. No.: 09/682,007

(22) Filed: Jul. 9, 2001

(65) Prior Publication Data

US 2003/0007201 A1 Jan. 9, 2003

(51) Int. Cl.[7] .............................. G02B 5/32; G02B 5/18; G02B 27/28
(52) U.S. Cl. ..................... 359/15; 359/569; 359/487; 359/488
(58) Field of Search .................. 359/3, 15, 18, 359/566, 569, 360, 130, 487, 488; 385/37

(56) References Cited

U.S. PATENT DOCUMENTS

| | | | | |
|---|---|---|---|---|
| 5,026,131 A | * | 6/1991 | Jannson et al. ............ | 359/15 |
| 5,486,934 A | * | 1/1996 | Huang ...................... | 359/15 |
| 5,726,782 A | * | 3/1998 | Kato et al. .................. | 359/3 |
| 5,808,285 A | * | 9/1998 | Rockstein et al. ...... | 235/472.02 |
| 5,955,721 A | * | 9/1999 | Dickson et al. ......... | 235/462.01 |
| 5,975,419 A | * | 11/1999 | Dickson et al. ......... | 235/472.02 |
| 6,085,978 A | * | 7/2000 | Knowles et al. ........ | 235/462.01 |
| 6,158,659 A | * | 12/2000 | Dickson et al. ......... | 235/462.01 |
| 6,256,435 B1 | * | 7/2001 | Albert et al. .................. | 385/37 |
| 6,280,848 B1 | * | 8/2001 | Okumura et al. ........... | 359/360 |

* cited by examiner

*Primary Examiner*—Audrey Chang

(57) ABSTRACT

An enhanced volume phase diffraction grating provides high dispersion, uniformly high diffraction efficiency and equal diffraction efficiencies for all polarizations across a wide range of wavelengths. The thickness of the volume phase material and the modulation of its refractive index are jointly established to provide equalization of diffraction efficiencies for all polarizations over a wide range of wavelengths. The equalization occurs where the S and P diffraction efficiencies are both at a maximum.

8 Claims, 13 Drawing Sheets

ENHANCED VOLUME PHASE GRATING WITH HIGH DISPERSION, HIGH DIFFRACTION EFFICIENCY AND LOW POLARIZATION SENSITIVITY

BACKGROUND OF INVENTION

The telecommunications industry is growing at an explosive pace as a result of the expanding need for the transmitting and receiving of greater amounts of information. The industry, in order to meet the needs of the market, has developed a number of technologies that make use of the inherent broadband capabilities of fiber optics. One of these technologies is Wavelength Division Multiplexing, or WDM.

WDM allows many signals to be transmitted simultaneously along a single optical fiber by sending each signal on a different carrier. Each carrier is a light beam of a slightly different wavelength than that of all of the other carriers. In order to combine these individual carrier beams into a single beam at the input of the fiber, an optical multiplexer (MUX) must be employed. To separate the carriers at the receiving end of the fiber, an optical de-multiplexer (DEMUX) must be employed. To be effective and economically practical, a MUX or a DEMUX must be capable of separating a multi-wavelength light beam into its individual wavelength components with a minimum amount of insertion loss and a minimum amount of Polarization Dependent Loss (PDL) and be relatively inexpensive and relatively compact.

The primary function of a DEMUX is to separate the carrier beams by wavelength. There are four basic means of providing this function: (1) thin film filters, (2) arrayed waveguides, (3) fiber Bragg gratings, (4) diffraction gratings. Thin film filters use multiple filters, each tuned to a different wavelength. Separation occurs at each filter along the light propagation path. This method is effective for systems with a small number of channels (one channel corresponds to one carrier wavelength). For systems with large numbers of channels (100 or more) thin film filters are not suitable because the insertion loss is excessive and the overall system becomes too complex.

Arrayed waveguides use an array of different length waveguides. A light beam consisting of multiple carriers, each at a different wavelength, exiting an input fiber is spread out so that it enters all of the waveguides In the array. The wavelength of each carrier in each waveguide, and the length of that waveguide, will determine its phase relative to the light of the same wavelength exiting all of the other waveguides. This phase relationship, in turn, will establish the overall phase distribution of the exiting wavefront for that particular wavelength. That phase distribution will then determine the output port to which this carrier wave will be directed.

Arrayed waveguides are very complex so that large arrays are difficult to make and some means of temperature control is generally required. This complexity places a practical upper limit on the number of channels that can be delivered with arrayed waveguides.

Fiber Bragg gratings are similar to thin film filters except that the filtering is done by a grating created within the fiber. The wavelength selection is done at each grating within the fiber. Fiber Bragg gratings have the same insertion loss problem as thin film filters—the insertion loss becomes excessive for large numbers of channels and, as with thin film filters, the overall system becomes unacceptably complex for a large number of channels.

All three of the above technologies have a relatively high cost per channel.

The fourth technology, diffraction gratings, has the potential for both high performance (large number of channels and low insertion loss) and relatively low cost. A diffraction grating provides separation of a large number of discrete wavelengths by the process of dispersion. An incident beam consisting of multiple carriers of different wavelengths is dispersed by diffraction as the beam is either reflected from the grating or transmitted through the grating. Each wavelength of the exiting beam is reflected or transmitted at a different angle of diffraction so that each carrier can enter a different port. This would be the case for a DEMUX. For a MUX, the separate carriers would be combined into a single beam in a process that is essentially the reverse of that described above for a DEMUX.

The obvious advantage of diffraction gratings over the three other technologies is that a single, relatively simple device provides the complete wavelength separation function. Therefore, the cost, complexity and size of the MUX or DEMUX will all be less, yet the number of channels will be greater.

There are four types of diffraction gratings but only three are suitable for WDM applications reflective and transmissive surface relief gratings and transmissive volume phase gratings. Surface relief gratings can have relatively high diffraction efficiencies, but generally only for one polarization. This creates a problem in WDM that is known as Polarization Dependent Loss, or PDL. While PDL cannot be eliminated in a surface relief grating, it can be minimized, but only at relatively low grating frequencies (roughly 600 lines per mm or less). This low grating frequency reduces the dispersion of the grating, making it more difficult to insert more channels and get good channel separation.

Transmissive volume phase gratings can also have high diffraction efficiencies but, as in the case of surface relief gratings, this high diffraction efficiency generally occurs only for one polarization. Therefore, a conventional volume phase grating (VPG) will also exhibit high PDL. While PDL can be minimized in a conventional VPG, either the overall diffraction efficiency will be low or the dispersion will be low, resulting in either unacceptably high insertion loss or relatively fewer channels.

It is obvious that none of the aforementioned technologies provides what is desirable in a WDM device—large number of channels, low insertion loss and low PDL across the full bandwidth of one of the telecommunications bands.

SUMMARY OF INVENTION

The present invention provides a means for overcoming the shortcomings of the prior art in WDM devices by creating an Enhanced Volume Phase Grating (E-VPG) that has high dispersion and uniformly high diffraction efficiency across a broad wavelength range for all polarizations. In the E-VPG, the thickness of the volume phase grating material, its bulk index, its index modulation and the angles of incidence and diffraction are all established so that the diffraction efficiency for both S-polarization and P-polarization are simultaneously maximized at the nominal wavelength. The volume phase grating material is created, coated, exposed and processed so that the desired values of these four major parameters are obtained.

A set of equations is developed that will determine these desired parameters for a number of different possible grating designs. Gratings in air or gratings attached to one or two prisms (a design often referred to as a Carpenter's prism or grism) can be created using these design equations. Some of the designs will have higher dispersion than others but all will have high dispersion and high diffraction efficiency across a relatively wide bandwidth for all polarizations.

By employing a reflective element in the path of the diffracted beam, the E-VPG can be used in a reflective, double pass mode so that the overall dispersion is increased over that of a single E-VPG, while still maintaining high overall diffraction efficiency and low PDL.

The advantage of the present invention over the prior art is that it can provide the advantages of diffraction gratings over the three competitive technologies—thin film filters, arrayed waveguides, fiber Bragg gratings—without the disadvantages generally associated with conventional volume phase gratings or surface relief gratings—high PDL and/or low dispersion and/or high insertion loss.

DETAILED DESCRIPTION

Figure 1:
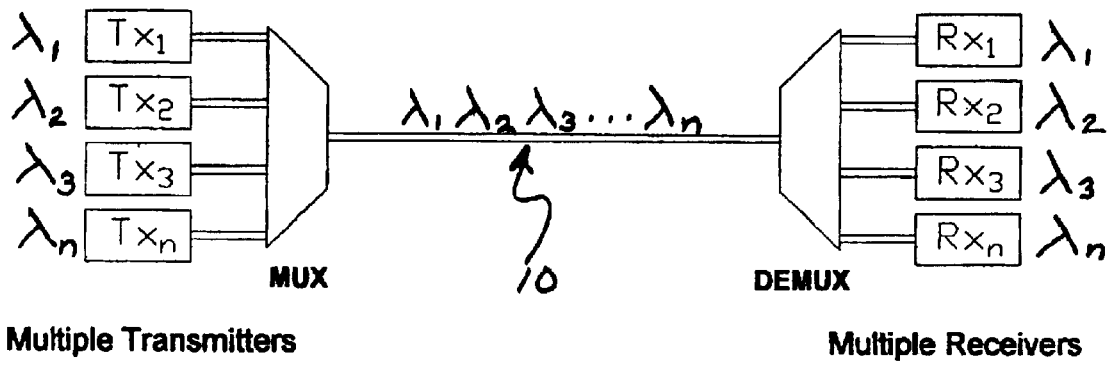
FIG. 1 shows the Wavelength Division Multiplexing portion of a telecommunications system.

FIG. 1 shows the Wavelength Division Multiplexing portion of a telecommunications system. The incoming beams from multiple sources ($Tx_1$, $Tx_2$, $Tx_3$, $Tx_n$) with corresponding multiple carrier wavelengths ($\lambda_1$, $\lambda_2$, $\lambda_3$, $\lambda_n$) are combined into a single beam in a multiplexer (MUX) and transmitted along a single optical fiber 10. At the receiving end of the fiber the de-multiplexer (DEMUX) breaks the single beam up into many beams, each of a different wavelength ($\lambda_1$, $\lambda_2$, $\lambda_3$, $\lambda_n$), corresponding to the wavelength of each of the carrier beams at the input to the MUX. These beams are then directed to the corresponding receptor elements ($Rx_1$, $Rx_2$, $Rx_3$, $Rx_n$). A first Enhanced Volume Phase Grating (E-VPG) of the present invention performs the wavelength combining function of the MUX. A second E-VPG of the present invention performs the wavelength separation function of the DEMUX.

Figure 2:
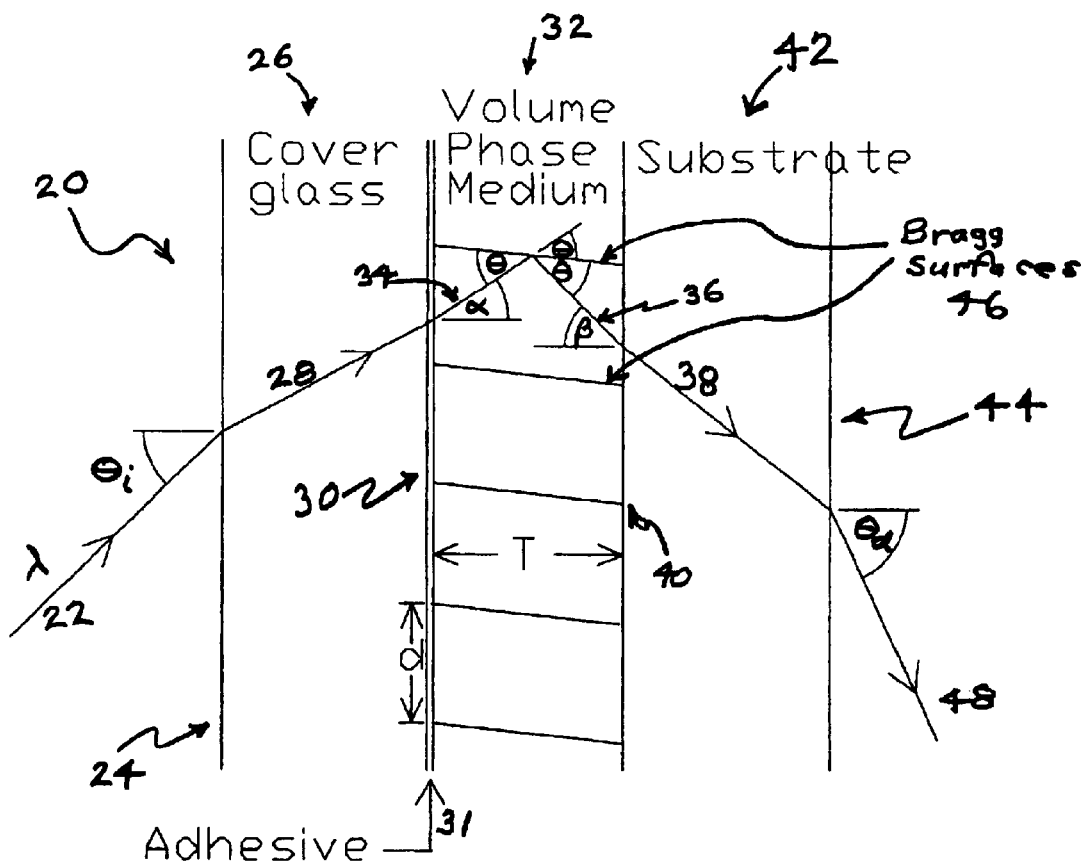
FIG. 2 is a cross-sectional view of an Enhanced Volume Phase Grating of the present invention.

FIG. 2 shows a cross-sectional view of an E-VPG transmissive diffraction grating, with a general reference number 20. An incident beam 22, with a free space wavelength $\lambda$ is incident on the first surface 24 of the cover glass 26 at an angle of incidence (relative to the normal to the surface 24) of $\theta_i$ degrees. Upon entering the cover glass, the beam is refracted in accordance with the well known Snell's law of refraction. The refracted beam 28 is transmitted to the interface surface 30 between the cover glass 26 and the volume phase medium 32, where it is again refracted in accordance with Snell's law. The refracted beam 34 is propagated into the volume phase medium 32 at an angle of refraction a relative to the normal to the interface surface 30.

Within the volume phase medium 32 there will be a periodic modulation of refractive index $\Delta n$. The surfaces of maximum refractive index are called the Bragg surfaces 46. The period of this modulation, measured along the interface surface 30, is designated as d. The incident beam 34 will be diffracted within the phase medium in accordance with the grating equation:

$$\lambda/nd = \sin \alpha + \sin \beta$$

where $\lambda$ is the free space wavelength of the incident beam, d is the grating spacing measured along the interface surface 30, n is the average bulk refractive index of the volume phase medium 32, $\alpha$ is the angle of the incident beam 34 within the volume phase medium 32 relative to the normal to the interface surface 30 and $\beta$ is the angle of the diffracted beam 36 within the volume phase medium 32 relative to the normal to the second interface surface 40. The effective thickness of the volume phase medium 32 is T.

The diffracted beam 36 will be refracted at the interface surface 40 between the volume phase medium 32 and the substrate medium 42 in accordance with Snell's law and transmitted to the exit surface 44 of the substrate 42, where it will be once again refracted in accordance with Snell's law and will exit the substrate 42 at an angle $\theta_d$ relative to the normal to the exit surface 44.

In the special, but most common, case where the four surfaces 24, 30, 40 and 44 are plane surfaces parallel to each other and the refractive indexes of the external entrance medium and the external exit medium are the same, then the grating equation can be written as:

$$\lambda/n_0 d = \sin\theta_i + \sin\theta_d$$

where $n_o$ is the refractive index of the entrance/exit medium.

The angle between the internal incident beam 34 and the Bragg surfaces 46 within the volume phase medium 32 is designated as θ. When the angle between the internal diffracted beam 36 and the Bragg surfaces 46 within the volume phase medium 32 is also θ, then the Bragg condition is said to be satisfied. In the example shown in FIG. 2, the internal angle of diffraction, α, is not equal to the internal angle of incidence, β. Therefore the Bragg surfaces will be tilted (not normal to surfaces 30 and 40) as indicated in FIG. 2.

In a WDM embodiment of the present invention, the wavelength, λ, of the incident beam is the nominal, or center, wavelength of one of the telecommunications bands. One such communication band is the C band, whose center wavelength is approximately 1546 nm and whose bandwidth is approximately 37 nm. The external angle of diffraction for the center wavelength is $\theta_d$. The angle of diffraction for other wavelengths of the particular telecommunications band will be greater than or less than $\theta_d$, in accordance with the grating equation.

In a preferred embodiment of the present invention, the E-VPG grating 20 is a holographic grating created with a VPG material, such as dichromated gelatin (DCG). Any of several volume phase materials can be used but DCG is well suited for the construction of an E-VPG because It is capable, when properly exposed and processed, of providing very high modulation of the index of refraction, a key requirement for a good E-VPG.

The substrate material 42 on which the volume phase medium 32 is coated is glass or fused silica, or one of any number of other well known transparent materials. The choice of the substrate material will generally be determined by the thermal expansion requirements. The volume phase medium will generally be sandwiched between two pieces of the transparent material—the substrate 42 and a cover, or capping, medium 26 and secured with a transparent optical adhesive, which also acts as a sealant to protect the DCG from the environment. The cover medium 26 is glass or fused silica, or one of any number of other well known transparent materials.

The theory of volume phase gratings is well known. Several theories exist but the one most applicable for thick gratings with moderate index modulation and relatively large angles of incidence and diffraction is the Kogelnik Coupled Wave Theory. While more sophisticated and precise theories exist, they are more complex and add little of significant value to the results obtained from the Kogelnik theory when the conditions are such that only the first order diffracted beam exists and the thickness of the medium is relatively large. These are the conditions that pertain to the E-VPG.

The major VPG parameters in the Kogelnik theory are the average bulk refractive index, n, of the medium, the effective thickness, T, of the medium and the index modulation, Δn of the medium. The entering and exiting beam parameters of interest are the angle of incidence, $\theta_i$, the angle of diffraction, $\theta_d$, and the polarization of the incoming beam. By convention, the polarization direction is defined as the direction of the electric field in the beam.

The polarization direction of an optical beam incident on an optical surface is generally defined relative to the plane of incidence, which is defined as the plane containing the chief ray of the incident beam and the normal to the surface at the point of incidence. If the polarization direction is perpendicular to the plane of incidence, the beam is said to be S-polarized, from the German word for perpendicular—Senkrecht. If the polarization direction lies in the plane of incidence, the beam is said to be P-polarized (P=parallel). If the beam is polarized in any other direction, its polarization can always be resolved into components in these two orthogonal directions. Therefore, knowing the effects on the beam of the VPG for both the S-polarization direction and the P-polarization direction will be sufficient to provide the effects for any random polarization direction.

The major parameters of interest in the Kogelnik theory are the S and P diffraction efficiencies, Es and Ep, where diffraction efficiency is defined as the ratio of the energy, or power, in the diffracted beam 48 to that in the incident beam 22, ignoring the Fresnel reflection losses.

The Kogelnik theory provides the S and P diffraction efficiencies of a VPG as functions of the product of the index modulation, Δn, and the effective thickness, T, of the medium. Generally, either effective thickness is assumed to be constant and Δn is varied or Δn is assumed to be constant and effective thickness is varied. In practice, the first approach is the most common—the effective thickness is assumed to be constant.

The effective thickness, T, is used instead of the physical thickness, Tp, because the index modulation, in general, is not constant throughout the depth of the medium. The exposing and chemical processing of many VPG materials, such as DCG, results in a decrease of Δn with depth in the medium. It is well known in the art that this variation can be taken into account by using an effective thickness that is less than the physical thickness and then using the assumption that the Δn is constant over this reduced effective thickness.

Figure 3:
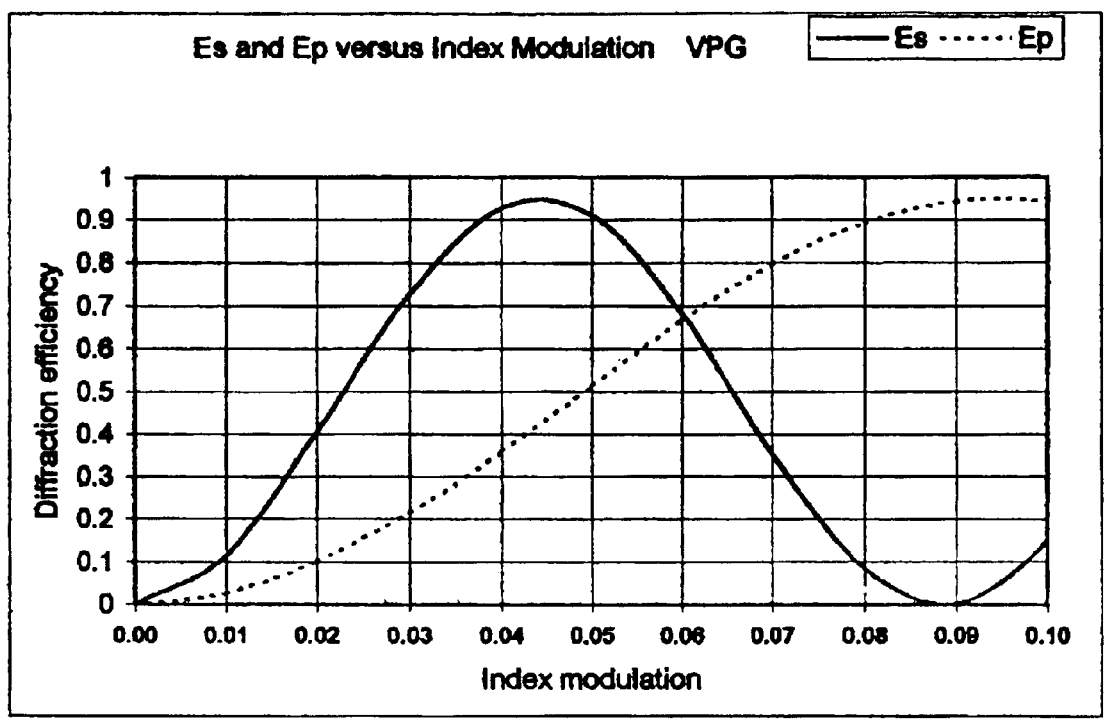
FIG. 3 is a typical plot of the S and P diffraction efficiencies of a Volume Phase Grating as functions of the index modulation, $\Delta n$, for a given effective medium thickness, T, and a given pair of angles of incidence and diffraction, $\Theta_i$, and $\Theta_d$.

FIG. 3 shows a typical plot of the S and P diffraction efficiencies of a VPG as functions of the index modulation, Δn, for a given effective thickness, T, and a given pair of angles of incidence and diffraction. Note that the P efficiency lags the S efficiency as a function of the index modulation. This is a result of the cosine factor that exists for the P polarized diffraction efficiency in the Kogelnik theory as shown in the following discussion.

In the Kogelnik theory, a parameter u is introduced, where u is defined by the following equation:

$$u = \pi \Delta n T / [\lambda \sqrt{(C_R C_S)}] \qquad (1)$$

where:
- λ is the nominal wavelength of the incident light beam in air
- T is the effective thickness of the VPG medium
- Δn is the peak modulation of the VPG medium
- $C_R$ is the incident beam obliquity factor (from the Kogelnik theory)
- $C_S$ is the diffracted beam obliquity factor (from the Kogelnik theory)
- $C_R$ and $C_S$ are both functions of the average bulk refractive index, n, of the VPG medium The S-polarization diffraction efficiency is then given by the following equation:

$$E_S = \sin^2 u \qquad (2)$$

and the P-polarization diffraction efficiency is given by the following equation:

$$E_P = \sin^2(u \cos 2\theta) \qquad (3)$$

Figure 4:
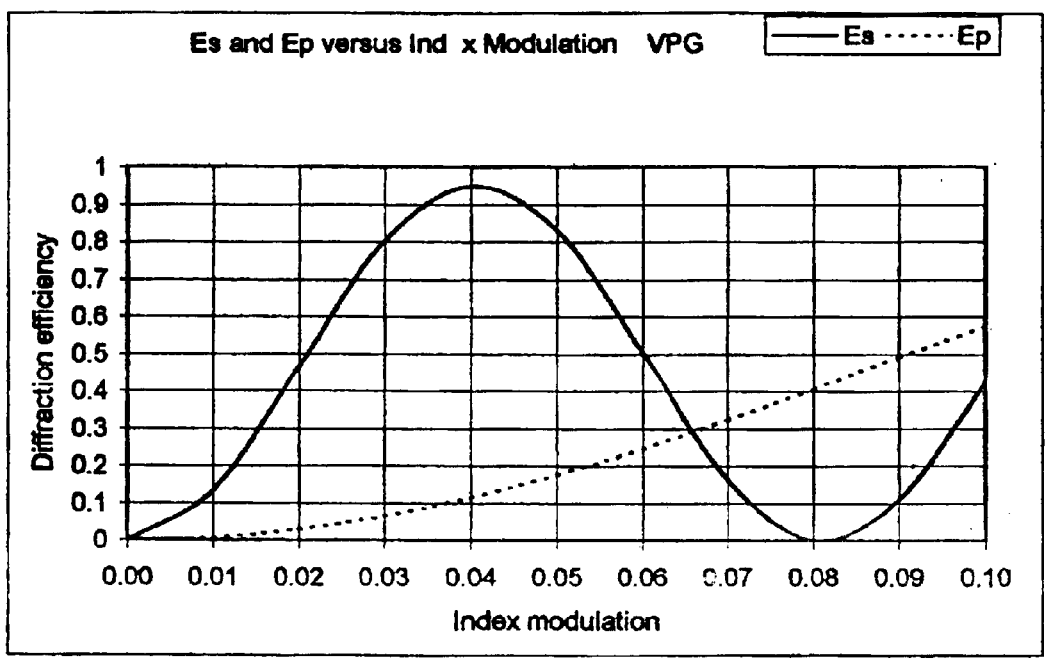
FIG. 4 is a plot of the S and P diffraction efficiencies of a Volume Phase Grating as functions of the index modulation, $\Delta n$, for a given effective medium thickness, T, and a given pair of angles of incidence and diffraction, $\Theta_i$, and $\Theta_d$, where these angles are greater than those in FIG. 3.

So the S-polarization diffraction efficiency is a function only of u, whereas the P-polarization diffraction efficiency is a function of both u and 2θ, which is the angle between the incident beam 34 and the diffracted beam 36 within the volume phase medium 32. The dependence on u of the P-polarization diffraction efficiency produces the lag of $E_p$ relative to $E_s$ in the graph of diffraction efficiencies versus index modulation. The angle θ is determined by the angle of incidence, $\theta_i$, and the angle of diffraction, $\theta_d$. As these angles increase, the lag will increase. FIG. 4 shows the S and P diffraction efficiency curves for angles of incidence and diffraction that are larger than those in the example of FIG. 3. Eventually, when the angle of incidence, $\theta_i$, and the angle of diffraction, $\theta_d$, are such that the angle between the two beams inside the medium, 2θ, is 90 degrees, the amount of lag will be infinite and the P diffraction efficiency will never rise above zero, no matter how large the value of Δn. In that case, the diffracted beam will be completely S-polarized.

Since the P efficiency lags the S efficiency, the two diffraction efficiencies are not, in general, maximum at the same value of Δn in a VPG that is intended for use in a WDM application, this will result in three possible scenarios, none of which are desirable.

Figure 5:
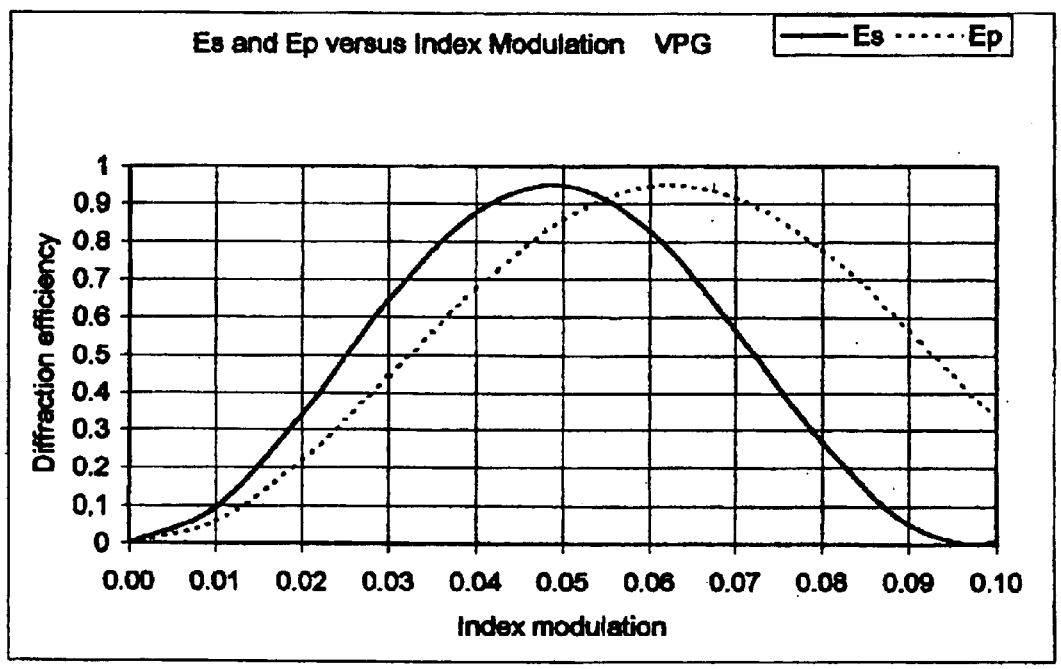
FIG. 5 is a plot of the S and P diffraction efficiencies of a Volume Phase Grating as functions of the index modulation, $\Delta n$, for a given effective medium thickness, T, and a given pair of angles of incidence and diffraction, $\Theta_i$, and $\Theta_d$, where these angles are less than those in FIG. 3.

First, one could reduce the P-S lag by using relatively small angles of incidence and diffraction as is done in the prior art (U.S. patent application Ser. No. 09/193,289). The S and P diffraction efficiency curves for this case are shown in FIG. 5. Note that the S and P diffraction efficiency curves intersect at a relatively high value of diffraction efficiency. Therefore, the S and P diffraction efficiencies will be equal and both diffraction efficiencies will be relatively high. The result will be reasonably low insertion loss and relatively low PDL across a fairly broad wavelength range. (Insertion loss is inversely related to the diffraction efficiency. PDL is directly related to the difference between the S and P diffraction efficiencies). The disadvantage of this approach is that the dispersion will be relatively low because the angles are relatively small. (The dispersion of a diffraction grating is directly related to the angle between the incident and diffracted beams.)

In a second case, the angles are increased in order to get more dispersion. Then we have the S and P diffraction efficiency curves similar to those shown in FIG. 3. One can then choose to operate at the peak of the S diffraction efficiency curve so that the insertion loss for S-polarization will be low. However, since the P diffraction efficiency is low at this value of Δn, the PDL will be very high.

In a third case, the angles are increased to provide very high dispersion so that we have the situation shown in FIG. 4. However, in this case, the choice is made to operate at the crossover point of the two curves in order to minimize the PDL. But both the S and P diffraction efficiencies will be low at this value of Δn. The net result is that this approach will provide very high dispersion and low PDL but very high insertion loss.

So the three cases just described will provide (1) low insertion loss and low PDL but low dispersion; (2) low insertion loss and high dispersion but large PDL; (3) high dispersion and low PDL but very high insertion loss. None of these three situations is optimum for WDM applications. What is desired is (a) high dispersion and (b) low insertion loss and (c) low PDL.

Figure 6:
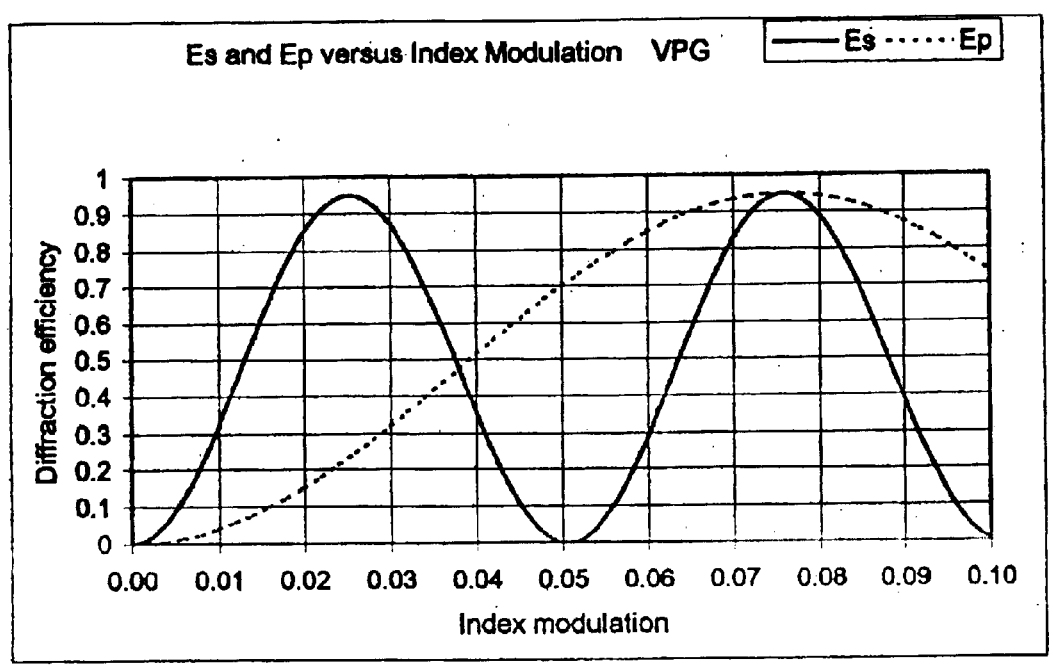
FIG. 6 is a plot of the S and P diffraction efficiencies of a Volume Phase Grating as functions of the index modulation, $\Delta n$, for a Volume Phase Grating in which the angles of incidence and diffraction, $\Theta_i$, and $\Theta_d$, are selected so that the second peak of the S diffraction efficiency curve coincides with the first peak of the P diffraction efficiency curve.

One can achieve this desired combination if the angles of incidence and diffraction are selected so that the P diffraction efficiency curve reaches its first maximum when the S diffraction efficiency curve reaches its second maximum. This situation is shown in FIG. 6. In this case, the S and P diffraction efficiencies are both equal and both maximum so that the PDL is minimized. In addition, the angles at which this equalization occurs are relatively large so that the dispersion is also large. The net result is that the insertion loss is low, the PDL is low and the dispersion is high. That is, we have the desired combination of all three major grating parameters.

Figure 7:
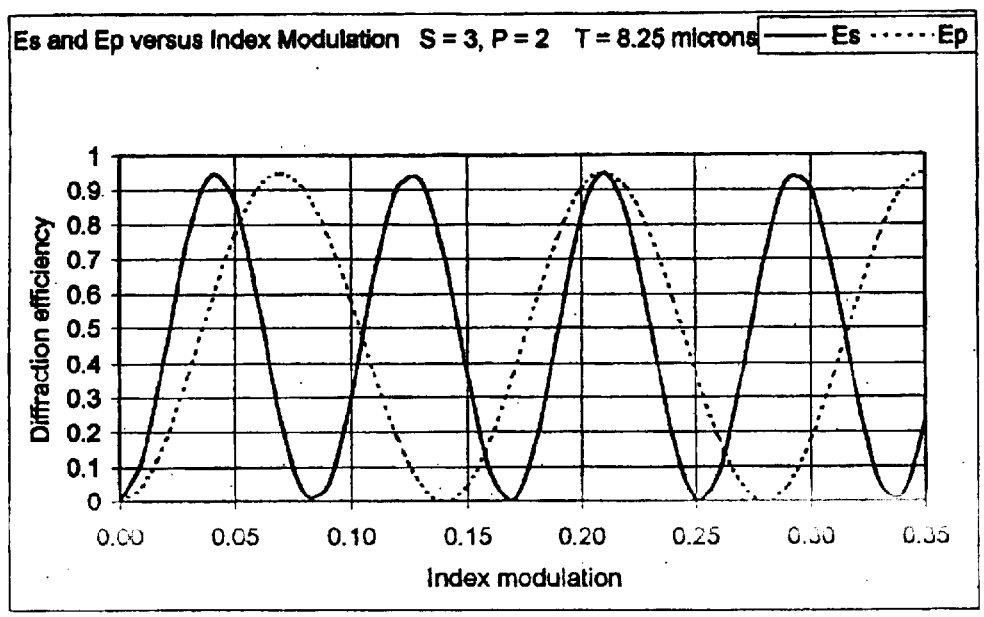
FIG. 7 is a plot of the S and P diffraction efficiencies of a Volume Phase Grating as functions of the index modulation, $\Delta n$, for a Volume Phase Grating in which the angles of incidence and diffraction, $\Theta_i$, and $\Theta_d$, are selected so that the third peak of the S diffraction efficiency curve coincides with the second peak of the P diffraction efficiency curve.

One can increase the dispersion even further by increasing the angles of incidence and diffraction until S and P maxima farther out along the Δn axis coincide. For example, one can select angles of incidence and diffraction so that the third peak of the S diffraction efficiency curve coincides with the first or second peak of the P diffraction efficiency curve, as shown in FIG. 7. This will provide greater dispersion and it will also allow the effective thickness, T, to be reduced (for a given index modulation, Δn). Higher order combinations are also possible but these combinations may be more difficult to fabricate.

In order for the S and P maxima to coincide, the values of Es and Ep from equations (2) and (3) must be simultaneously equal to 1. Es will be equal to 1 when $$v = \frac{2s-1}{2}\pi$$

and Ep will be equal to 1 when $$v\cos(2\theta) = \frac{2p-1}{2}\pi,$$

where S and P are integers, 1, 2, 3, . . . The value of cos(2θ) at which the Es and Ep maxima coincide can be found by simply solving the above two equations for cos(2θ). The result is equation (4) below.

$$\cos(2\theta)=(2p-1)/(2s-1) \quad (4)$$

(Since the cosine of an angle cannot be greater than 1 for any real angle, the integer, p, must always be less than the integer, s, in equation (4).)

where:

s is the order of the S diffraction efficiency peak (1, 2, 3, . . . ) and p is the order of the P diffraction efficiency peak (1, 2, 3, . . . )

θ is the angle between the incident beam and the Bragg planes inside the medium (A Bragg plane is a plane of maximum refractive index in the medium)

2θ is the angle between the incident beam and the diffracted beam inside the medium Equation (1) can be re-arranged to provide an equation for the index modulation:

$$\Delta n = \frac{v\lambda}{\pi T}\sqrt{C_R C_S}.$$

But from the derivation of Equation (4) above we know that $$v = \frac{2s-1}{2}\pi$$

when Es is maximum. Therefore, when Es is maximum, $$\Delta n = \frac{\lambda}{T}\left(\frac{2s-1}{2}\right)\sqrt{C_R C_S}$$

where $C_R = \cos\alpha$ $$C_S = \cos\alpha - \frac{\lambda}{nd}\tan\left(\frac{\beta-\alpha}{2}\right)$$

(See Kogelnik, H. "Coupled Wave Theory for Thick Hologram Gratings," Bell System Technical Journal, Vol. 48, No. 9, 1969, Equation 23) The final result is:

$$\Delta n = \frac{\lambda}{T}\frac{2s-1}{2}\sqrt{C_R C_S} = \frac{\lambda}{T}\left(\frac{2s-1}{2}\right)\sqrt{(\cos\alpha)\left(\cos\alpha - \frac{\lambda}{nd}\tan\left(\frac{\beta-\alpha}{2}\right)\right)} \quad (5)$$

where all terms have been previously defined. So the value of the index modulation, $\Delta n$, at which the S-polarization diffraction efficiency is maximum, for a given wavelength, index of refraction of the medium and effective thickness of the medium, is given by equation (5). Therefore, when equations (4) and (5) are satisfied simultaneously, the S and P diffraction efficiencies will be maximized simultaneously.

From FIG. 2 it can be seen that $\alpha+\beta=2\theta$, so that Equation (4) can be solved for $\beta$, the internal angle of diffraction, to yield:

$$\beta = a\cos\left(\frac{2p-1}{2s-1}\right) - \alpha \quad (6)$$

Therefore, for given values of the bulk refractive index, n, effective thickness, T and wavelength, $\lambda$, and arbitrarily selected values of the integers s and p and the internal angle of incidence, $\alpha$, the value of the internal angle of diffraction, $\beta$, established by Eq. (6) and the value of the index modulation, $\Delta n$, established by Eq. 5 will result in simultaneously maximizing the S-polarization diffraction efficiency, Es, and the P-polarization diffraction efficiency, Ep, at a common value of the index modulation, $\Delta n$.

This coincidence of the sth peak of the S-polarization diffraction efficiency curve and the pth peak of the P-polarization diffraction efficiency curve at a common value of the index modulation, $\Delta n$, is the major novel property of the Enhanced Volume Phase Grating. FIG. 7 is an example of an Enhanced Volume Phase Grating where the third peak of the S-polarization diffraction efficiency curve coincides with the second peak of the P-polarization diffraction efficiency curve at an index modulation value of 0.21.

Note that coincidence of the sth peak of the S diffraction efficiency curve and the pth peak of the P diffraction efficiency curve will also occur when the following equation for $\beta$ is satisfied:

$$\beta = 180 - a\cos\left(\frac{2p-1}{2s-1}\right) - \alpha \quad (7)$$

That is, the S and P diffraction efficiency peaks will coincide when the angle between the incident beam and the Bragg planes inside the medium is either $\theta$ or 90-$\theta$. In other words, the two angles will lie equally to either side of the zero-P-efficiency angle of 45 degrees.

The second angle will generally exceed the internal angle of total internal reflection (TIR) if the substrate is parallel to the VPG medium and the external medium is air. This problem can be overcome by using a dual-prism grism design such as that shown in FIG. 11. This type of design allows the angles of incidence and diffraction inside the medium to exceed the normal TIR angle.

The required value of the index modulation, $\Delta n$, will be dependent on the effective thickness, T, the wavelength, $\lambda$, and the two obliquity factors, $C_R$ and $C_S$. The values of the obliquity factors will be dependent on the bulk index of the medium and the external angles of incidence and diffraction, as established by the Kogelnik theory.

Designing an Enhanced Volume Phase Grating in Accordance with the Present Invention As an example of the design process for an Enhanced Volume Phase Grating, consider the simplest case, where s=2 and p=1. Not only is this the simplest E-VPG design, it is also the easiest E-VPG to fabricate and is, therefore, the most likely E-VPG to be used in practice.

Note that the selection of the integer values of s and p is completely arbitrary, so long as s>p. The design process would be identical for any combination of s and p integers. E-VPGs resulting from a selection of larger values of s and p would have greater dispersion but would be more difficult to fabricate and would require the use of external prisms.

Once s and p are selected (2 and 1 in this example), the angle of incidence, $\theta_i$, must be selected. The angle of incidence, $\theta_i$, can be selected to provide a symmetric grating design, where the angle of diffraction, $\theta_d$, is equal to the angle of incidence, $\theta_i$, or a non-symmetric grating design, where the angle of diffraction, $\theta_d$, is not equal to the angle of incidence, $\theta_i$. The choice is generally governed by other factors in the overall system design.

Once $\theta_i$, is established, the internal angle of incidence, $\alpha$, can be determined using the well known Snell's Law and the known bulk refractive index, n, of the volume phase medium. Then, once this internal angle of incidence, $\alpha$, is determined, equation (6) can be used to establish the internal angle of diffraction, $\beta$. Then Snell's Law can be used to determine the external angle of diffraction, $\theta_d$.

Knowing the internal angle of incidence, $\alpha$, the internal angle of diffraction, $\beta$, the bulk refractive index, n, of the volume phase medium and the free space wavelength, $\lambda$, of the incident beam, one can use the following equation, which is a transposition of the grating equation noted earlier, to determine the grating period, d:

$$d = \frac{\lambda}{n(\sin\alpha + \sin\beta)}. \quad (8)$$

Furthermore, knowing the external angle of incidence, $\theta_i$, and the external angle of diffraction, $\theta_d$, the construction illumination geometry of the E-VPG can be established. In fact, if the application wavelength and the construction wavelength for the E-VPG are the same, then $\theta_i$ and 180+$\theta_d$ will be the construction angles for the laser beams used in constructing the E-VPG. If the construction wavelength is not the same as the application wavelength, as is often the case, then the construction angles must be modified in accordance with procedures that are well known in the art of fabrication of volume phase gratings (See, for example, the following US patents: U.S. Pat. No. 6,085,980 and U.S. Pat. No. 6,112,990).

The final step in the fabrication process of the E-VPG is to expose and process the E-VPG so that the peak index modulation, Δn, is equal to the value calculated in equation (5). Exposure and processing methods to accomplish this are well known in the art (See, for example, Chang, M. "Dichromated Gelatin of Improved Quality", Applied Optics, Vol. 10, p. 2250, 1971 and Meyerhofer, D. "Phase Holograms in Dichromated Gelatin," RCA Review, Vol. 35, p. 110, 1972.)

Note: In an alternative design process, one can select a value for the external angle of diffraction, $\theta_d$, and use Snell's Law to determine the internal angle of diffraction, β, equation (6) to determine the internal angle of incidence angle, α and Snell's Law to determine the external angle of incidence, $\theta_i$. The construction process and the procedure to establish the peak index modulation, Δn, would be the same as for the case where the angle of incidence, $\theta_i$, was selected at the outset.

Satisfying equations (5) and (6) is sufficient to obtain high diffraction efficiency for both polarizations simultaneously. And the angles needed to satisfy the second of these two equations will result in high dispersion. However, there is a fourth requirement for a WDM grating that has made the accomplishment of the present invention heretofore impossible. The WDM application requires low insertion loss and low PDL across the full width of one of the telecommunications passbands. That is, for the C band, the insertion loss and the PDL must be acceptably low over the full wavelength range from 1528 nm to 1565 nm. That is impossible to achieve in a conventional VPG because of the high Bragg angle sensitivity that would result when the necessary equations are satisfied. Bragg angle sensitivity is the variation of diffraction efficiency as a function of either the wavelength or the angle of incidence of the incident beam.

Figure 8:
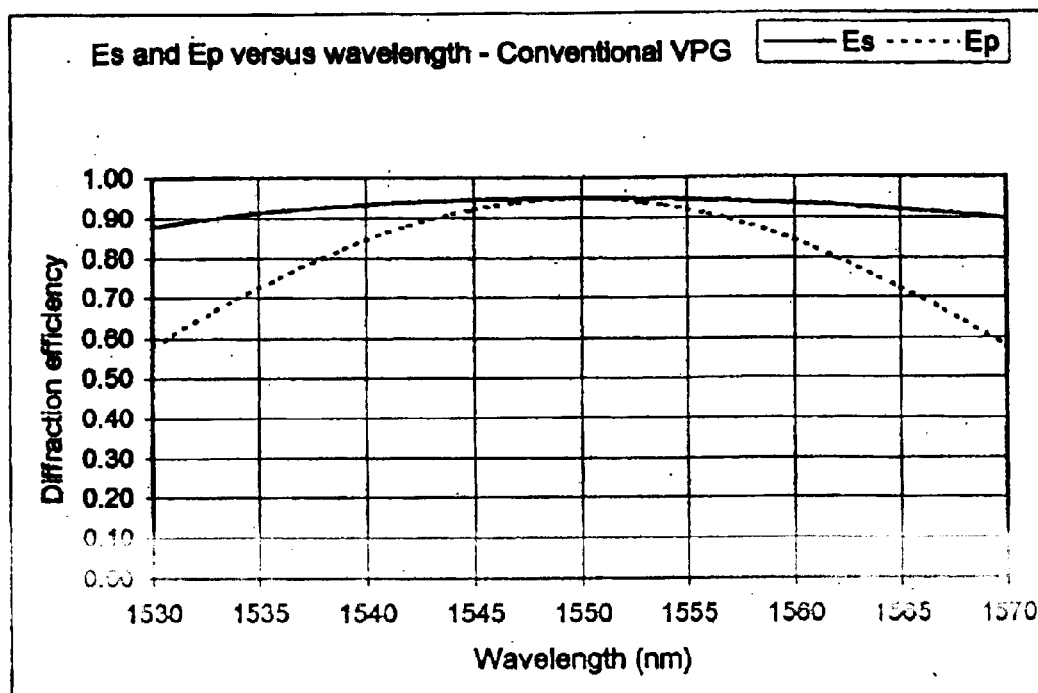
FIG. 8 is a plot of the S and P diffraction efficiencies as functions of wavelength for the Volume Phase Grating of FIG. 6.

In a conventional VPG, Δn is typically in the range of 0.05 to 0.08. In order to satisfy equation (2) an effective thickness on the order of 25 to 35 microns would be required. It is well known that Bragg angle sensitivity is a strong function of the effective thickness of the medium. FIG. 8 shows the variation of S and P diffraction efficiencies for an effective medium thickness of 35 microns. The Bragg angle sensitivity is quite large and the resulting PDL at the ends of the passbands is totally unacceptable for WDM applications.

The present invention solves this final problem by exposing and processing the medium (DCG, in this case) to get a Δn on the order of 0.2 or greater. Processing procedures for DCG are well known in the art and processing for high Δn, while difficult, is an extension of known DCG processing methods.

In a typical embodiment of the present invention, the medium (DCG) is spin coated on a glass or fused silica substrate to a physical thickness that is on the order of 15 microns. It is exposed in a conventional dual-beam holographic grating fabrication process using a laser with a wavelength to which the DCG is responsive. It is then processed in a sequence of alcohol water baths using well-known DCG processing procedures. After drying and edge stripping to provide an adhesive o-ring seal when capped, the actual gratings are then diced from the larger grating, and then sealed (capped) with a cover glass.

In this particular embodiment of the present invention, the exposure and processing of the grating will yield a final effective thickness of approximately 9 to 10 microns.

Figure 9:
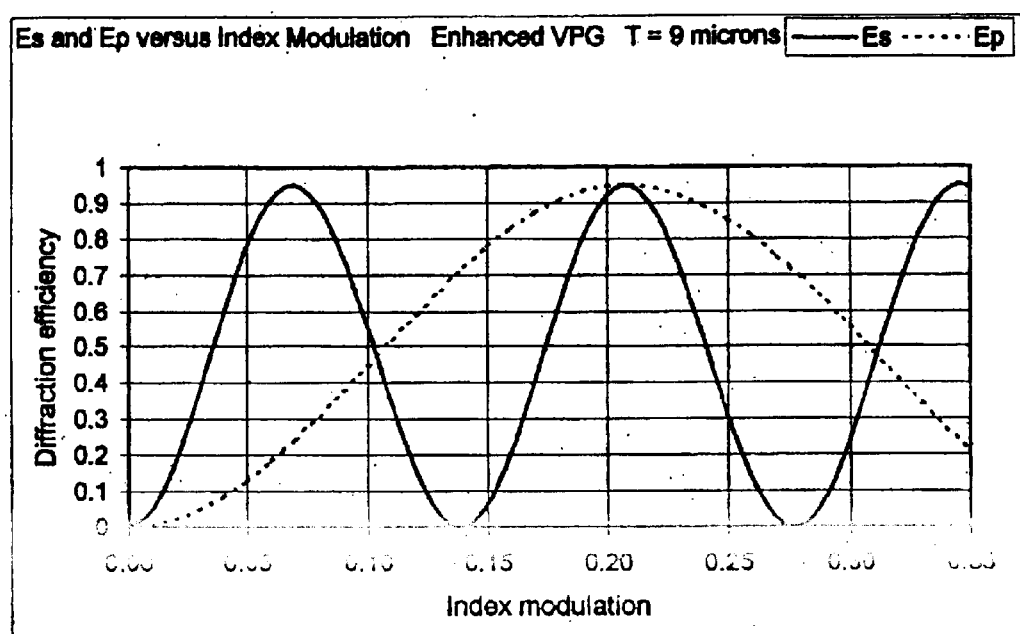
FIG. 9 is a plot of the S and P diffraction efficiencies as functions of the index modulation, $\Delta n$, for an Enhanced Volume Phase Grating of the present invention.

FIG. 9 shows the S and P diffraction efficiency curves for one example of an Enhanced Volume Phase Crating of the present invention with an effective thickness of 9 microns and with the angles of incidence and diffraction selected to satisfy equation (4). The post-processing bulk refractive index of the medium is approximately 1.27, but may vary from 1.2 or less to 1.4 or greater.

Figure 10:
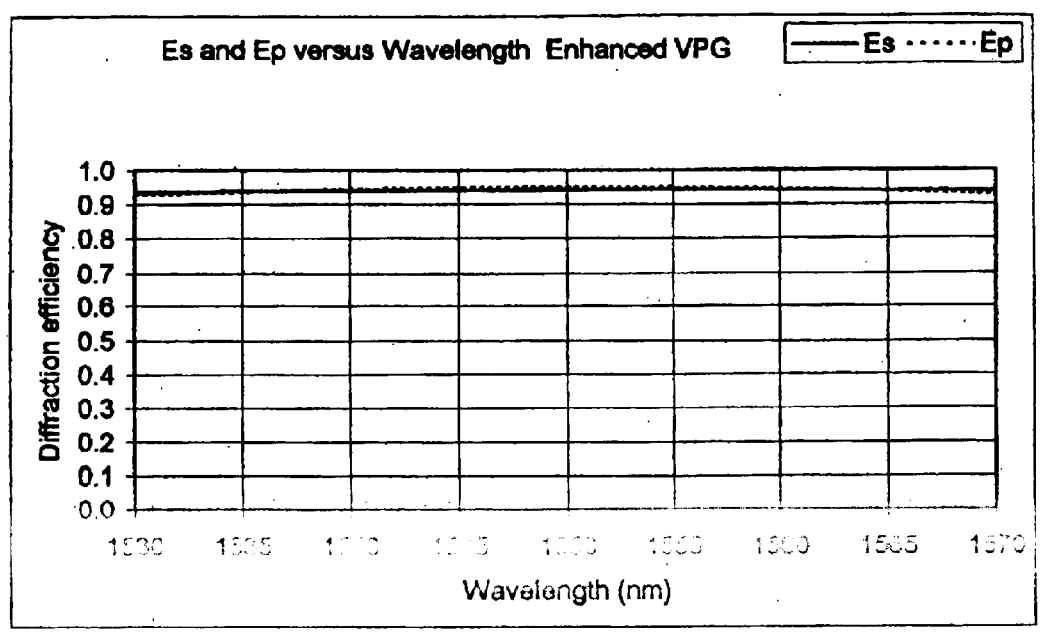
FIG. 10 is a plot of the S and P diffraction efficiencies as functions of wavelength for the Enhanced Volume Phase Grating of the present invention.

FIG. 10 shows the variation of the S and P diffraction efficiencies as functions of wavelength for this particular E-VPG. Note that both efficiencies fall off only slightly to either side of the nominal wavelength and the difference in falloff of the two polarizations is very small so that PDL will be low across the full bandwidth.

This design now satisfies all of the major requirements for an effective diffraction grating for WDM applications—high dispersion, low insertion loss, low PDL—all across the full passband.

An extension of this invention uses higher numbers for p and s in Equations 4 and 5. This will result in gratings that have higher dispersion than the grating described above. In general, higher p and s numbers will require the use of a grism design.

Figure 11:
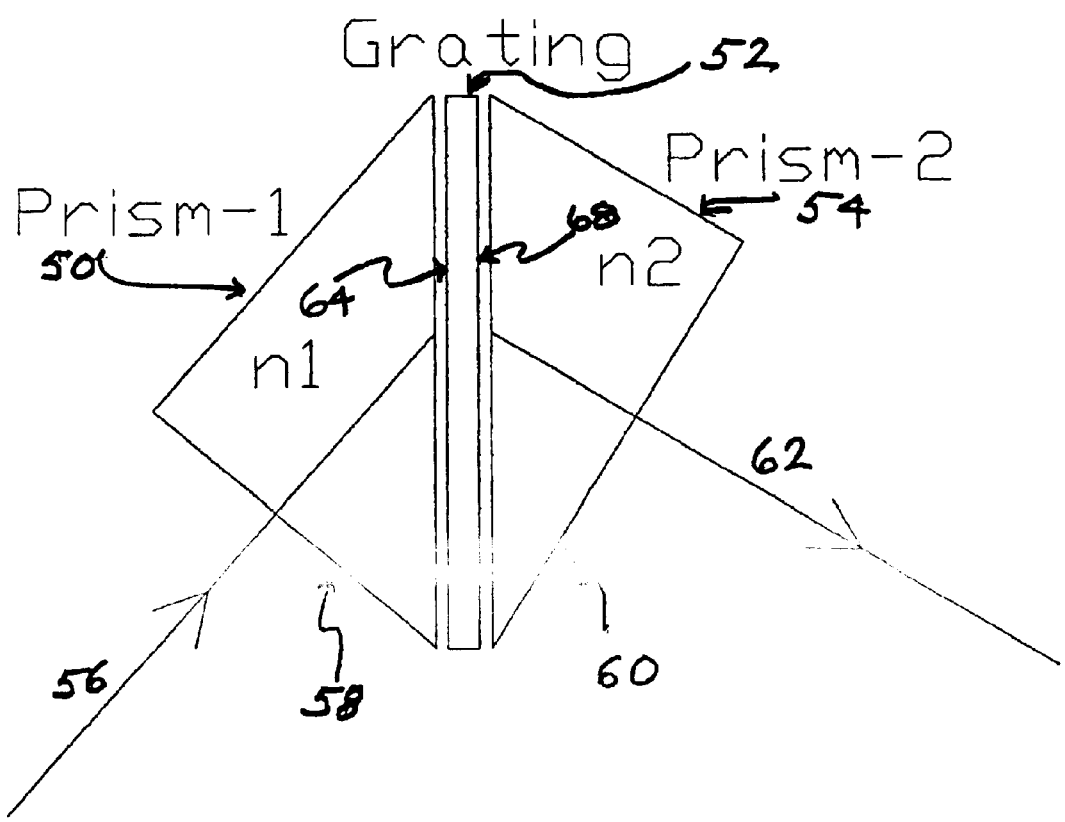
FIG. 11 is an embodiment of the present invention in which a prism is used at the entrance and/or exit surface of the grating.

A further extension of this invention is shown In FIG. 11. A first prism 50 is used at the entrance surface 64 of the grating 52 and a second prism 54 is used at the exit surface 68 of the grating 52. The incident beam 56 may be normal to the entrance surface 58 of the prism 50 or it may be at some non-normal angle, depending on the design requirements of the grating and the system in which it is to be used. Similarly, the exit beam 62 may be normal to the exit surface 60 of the second prism or it may be at some non-normal angle, depending on the design requirements of the grating and the system in which it is to be used. The two prisms are not necessarily equal in geometric shape or refractive index. In the extreme, the refractive index of one of the prisms could be 1, so that the two-prism embodiment becomes a single-prism embodiment.

A prism is required for higher order grating designs (larger values of s and p) but it may also be advantageous in the primary order design for packaging reasons or mechanical stability.

Figure 12:
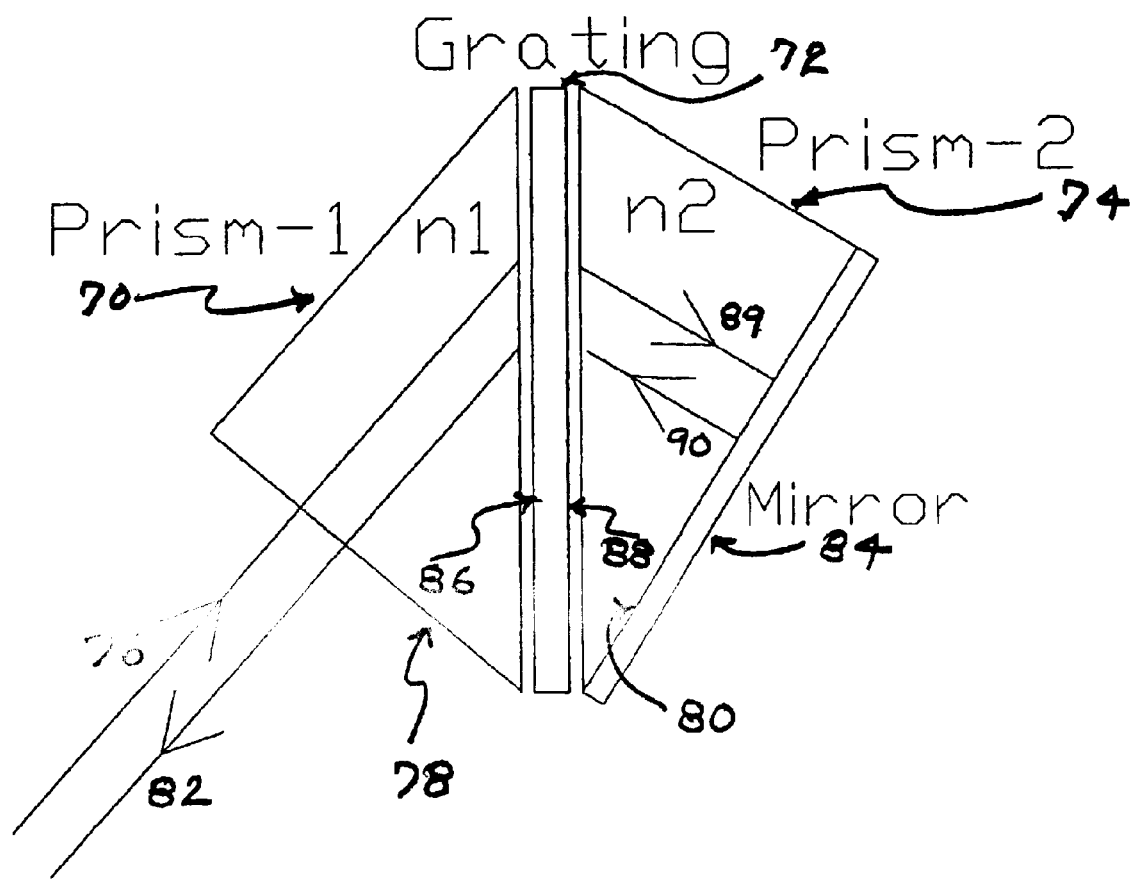
FIG. 12 is an embodiment of the present invention in which a reflective means is provided at the final surface of the exit prism.

A further extension of this invention is shown in FIG. 12. This extension of the present invention is similar to that shown in FIG. 11 but with the addition of a mirror 84 attached to the final surface 80 of the exit prism 74. The mirror 84 reflects the diffracted beam 89 back into the grating 72 for a second pass 90, thereby increasing the overall dispersion. The double-pass design concept for conventional (non-enhanced) volume phase gratings has been described in the prior art (U.S. patent application Ser. No. 09/193,289).

Figure 13:
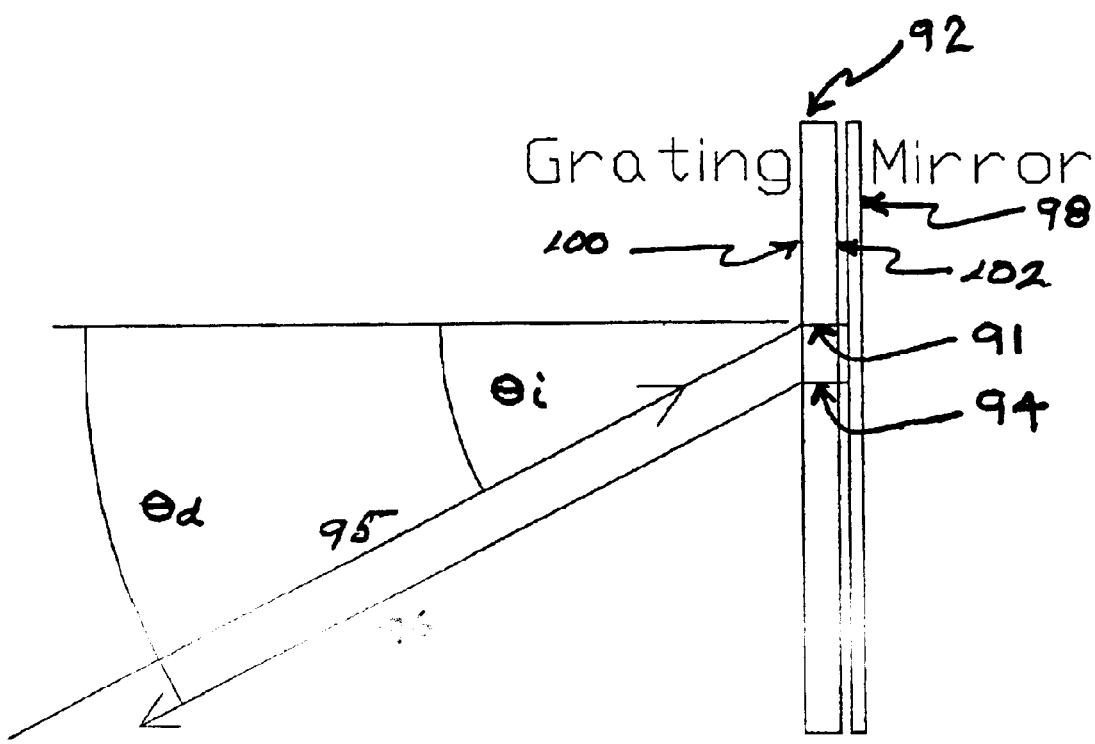
FIG. 13 is an embodiment of the present invention in which a reflective means is provided at the exit surface of the grating.

A further extension of this invention is shown in FIG. 13. This extension of the present invention uses a mirror 98 attached to, or located in the vicinity of, the final surface 102 of the grating 92. The mirror 98 reflects the diffracted beam 91, back into the grating at, or near, normal incidence for a second pass 94, through the grating 92 thereby doubling the dispersion. Such a design functions like a Littrow grating, but with higher dispersion for a given grating spatial frequency.

Figure 14:
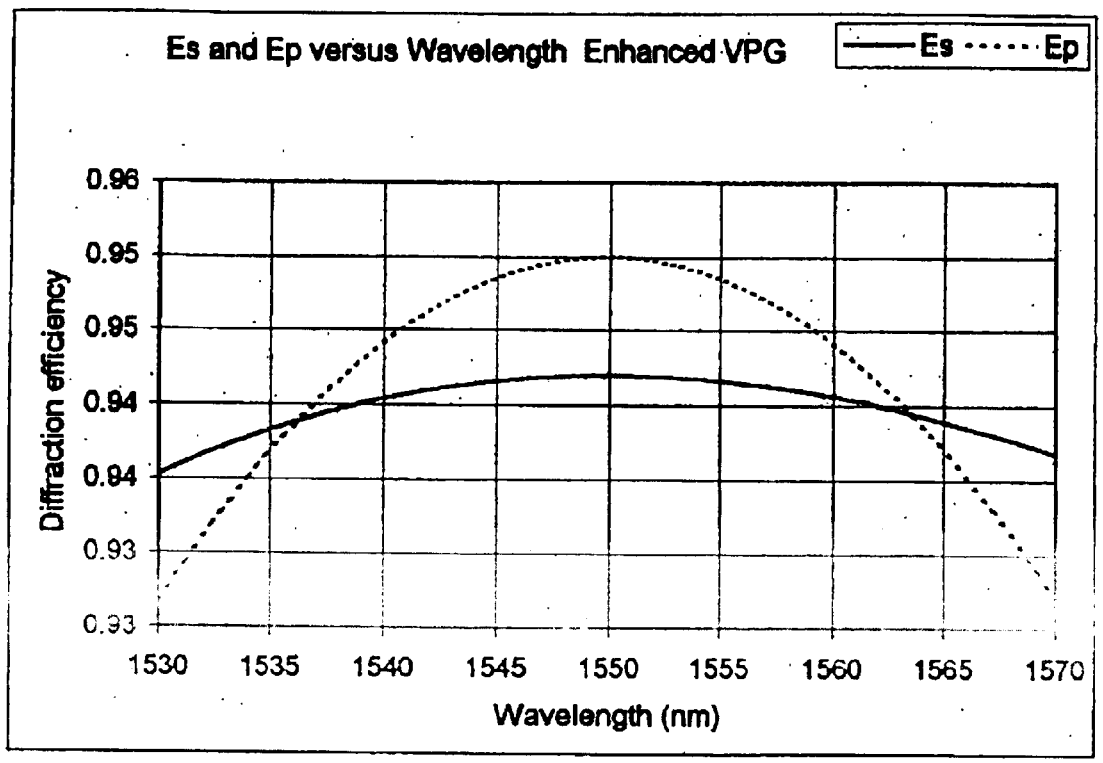
FIG. 14 is a plot of the S and P diffraction efficiencies as functions of wavelength for an embodiment of the present invention in which the worst case PDL is reduced.

In a further extension of this invention, the substrate 42 and the cover glass 26 are both coated with an anti-reflection (AR) coating so that at the nominal wavelength, λ, the overall loss for S-polarization is slightly greater than the overall loss for P-polarization. The resultant S and P wavelength Bragg sensitivity curves are shown in FIG. 14. Note that the PDL is now non-zero at the nominal wavelength but it is also less at the wavelengths corresponding to the ends of the passband. That is, the worst-case PDL has been reduced.

Figure 15:
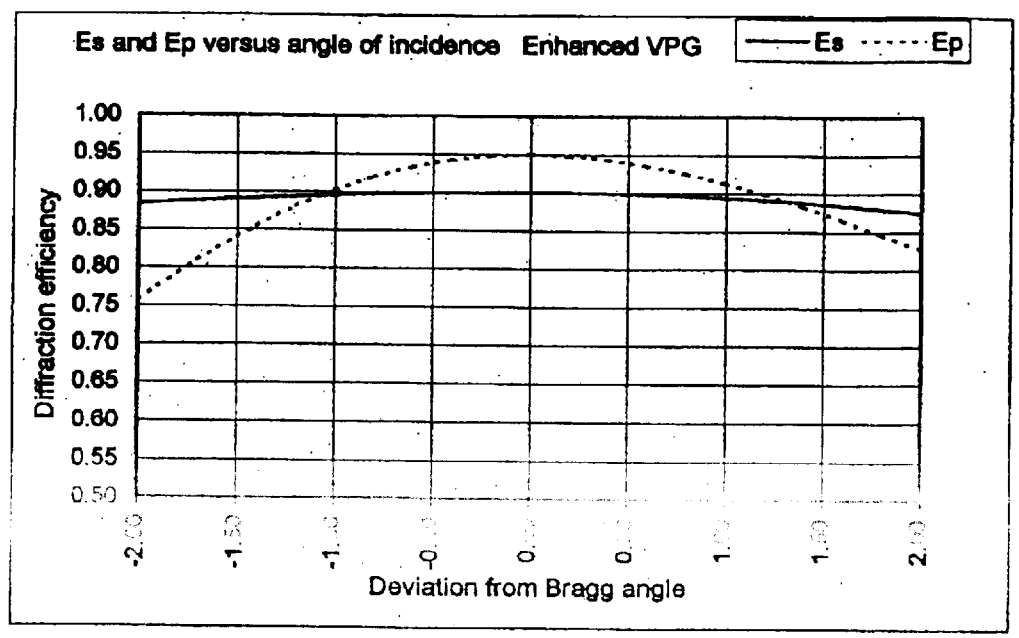
FIG. 15 is a plot of the S and P diffraction efficiencies as functions of the angle of incidence for an embodiment of the present invention in which the Bragg sensitivity is reduced for a double-pass design.

In yet another extension of this invention, the substrate 42 and the cover glass 26 are both coated with an AR coating so that at the nominal wavelength, λ, the overall loss for S-polarization is greater than the overall loss for P-polarization by an amount that is greater than that of the prior extension discussed above. This additional loss improves the performance of the E-VPG grating in a two-pass design. This can be seen in FIG. 15. This graph shows the variation in the S and P diffraction efficiencies as a function of the angle of incidence of the beam. In a two-pass design, the angle of incidence at the second pass through the grating varies as a function of the wavelength due to the dispersion resulting from the first pass through the grating. At the extremes of the passband, the angle of incidence will be such as to lower the S and P diffraction efficiencies. Increasing the nominal loss for the S beam, as shown, will reduce the worst case PDL.

In a preferred embodiment of this invention, the angle of incidence, α, in the volume phase medium 32 will equal the angle of diffraction, β, in the volume phase medium 32 at the nominal wavelength, λ. While other embodiments that can satisfy equations (4) and (5) (or (5) and (6)) will be obvious to one skilled in the art, this particular embodiment has two significant advantages: (a) the dispersion will be maximized compared to other combinations of angles that satisfy equations (4) and (5); (b) the Bragg surfaces 46 will be normal to the surface 40 of the substrate 42, which simplifies the fabrication process. However, embodiments in which the angles α and β are not equal may have geometric or other advantages and are therefore included as extensions of the art exemplified in the preferred embodiment.

While there have been described what are considered to be preferred embodiments of the present invention, variations and modifications will occur to those skilled in the arts once they become acquainted with the basic concepts of the invention. Therefore, it is intended that the appended claims shall be construed to include both the preferred embodiments and all such variations and modifications as fall within the true spirit and scope of the invention.

What is claimed is:

1. An enhanced volume phase grating comprising:

a rigid support means;

a volume phase medium attached to said rigid support means;

a transparent cover means attached to said volume phase medium with a transparent adhesive to provide a sealant and protectant for said volume phase medium;

the bulk refractive index, n, of said volume phase medium being periodically modulated within the thickness, T, of said volume phase medium in a direction parallel to the surface of said volume phase medium, with a peak value of refractive index equal to n+Δn, where Δn is the peak modulation of said bulk refractive index, n, the periodic sequence of said peak values of said bulk refractive index throughout said thickness, T, of said volume phase medium creating a periodic structure of Bragg surfaces within said volume phase medium with a period, d, where said period, d, is established by selecting any two positive integers s and p, such that s<p, and any arbitrary external angle of incidence, $\theta_i$, calculating the internal angle of diffraction, β, with the following equation:

$$\beta = \text{either } a\cos\left(\frac{2p-1}{2s-1}\right) - \alpha \text{ or } 180 - a\cos\left(\frac{2p-1}{2s-1}\right) - \alpha,$$

where:

$$\alpha = a\sin\left(\frac{\sin\theta_i}{n}\right)$$

and using the following equation:

$$d = \frac{\lambda}{n(\sin\alpha + \sin\beta)},$$

where λ is the nominal free-space wavelength for which said enhanced volume phase grating is designed, and said peak modulation, Δn, of said bulk refractive index is obtained from the following equation:

$$\Delta n = \frac{\lambda}{T}\left(\frac{2s-1}{2}\right)\sqrt{(\cos\alpha)\left(\cos\alpha - \frac{\lambda}{nd}\tan\left(\frac{\beta-\alpha}{2}\right)\right)},$$

values of said bulk refractive index, n, and said peak modulation, Δn, being established using well known exposure and processing procedures for said volume phase medium;

whereby the S-polarization diffraction efficiency and the P-polarization diffraction efficiency of said enhanced volume phase grating, when illuminated by an incident beam of said nominal free-space wavelength, λ, at said external angle of incidence, $\theta_i$, are simultaneously maximized at a common value of the product ΔnT, thereby simultaneously minimizing insertion loss and PDL in a highly dispersive volume phase grating.

2. The enhanced volume phase grating of claim 1 wherein said volume phase medium is dichromated gelatin.

3. The enhanced volume phase grating of claim 1 wherein said index modulation, Δn, of said volume phase medium is greater than 0.1, and preferably on the order of 0.2, thereby decreasing Bragg angle sensitivity.

4. The enhanced volume phase grating of claim 1 wherein said rigid support means is a transparent medium and said transparent cover means is a similar or identical transparent medium.

5. The enhanced volume phase grating of claim 4 further including a reflective means to reflect the diffracted beam back toward and into said enhanced volume phase grating.

6. The enhanced volume phase grating of claim 4 wherein the external surfaces of said transparent medium and said transparent cover means are coated with an anti-reflection coating such that the overall loss for the S-polarized light and the overall loss for the P-polarized light are minimized and substantially equal at said nominal free-space wavelength.

7. The enhanced volume phase grating of claim 4 wherein the external surfaces of said transparent medium and said transparent cover means are coated with an anti-reflection coating such that the overall loss for the S-polarized light is somewhat greater than the overall loss for the P-polarized light at said nominal free-space wavelength, thereby minimizing the maximum PDL.

8. The enhanced volume phase grating of claim 4 wherein the external surfaces of said transparent medium and said transparent cover means are coated with an anti-reflection coating such that the overall loss for the S-polarized light is somewhat greater than the overall loss for the P-polarized light after two passes through said enhanced volume phase grating at said nominal free-space wavelength, thereby minimizing the maximum PDL in a two-pass design.

* * * * *

UNITED STATES PATENT AND TRADEMARK OFFICE
CERTIFICATE OF CORRECTION

PATENT NO.    : 6,750,995 B2
DATED         : June 15, 2004
INVENTOR(S)   : Leroy David Dickson It is certified that error appears in the above-identified patent and that said Letters Patent is hereby corrected as shown below:

<u>Column 13,</u>
Line 60, "$s < p$" should be -- $s > p$ --.

Signed and Sealed this

Eighteenth Day of January, 2005

JON W. DUDAS
*Director of the United States Patent and Trademark Office*